United States Patent [19]

Zoludow

[11] Patent Number: 4,631,374

[45] Date of Patent: Dec. 23, 1986

[54] DIAPHRAGM OPERATED SWITCH TYPE BIN LEVEL SENSOR

[75] Inventor: Richard S. Zoludow, South Bend, Ind.

[73] Assignee: Dwyer Instruments, Inc., Michigan City, Ind.

[21] Appl. No.: 805,780

[22] Filed: Dec. 6, 1985

[51] Int. Cl.$^4$ .................... B67D 5/08; H01H 35/34
[52] U.S. Cl. ................... 200/61.21; 73/301; 222/55
[58] Field of Search .............. 200/61.21, 61.20; 222/55; 141/95; 340/613, 614

[56] References Cited

U.S. PATENT DOCUMENTS

| | | | |
|---|---|---|---|
| 3,018,343 | 1/1962 | Grostick | 200/61.21 |
| 3,129,299 | 4/1964 | Bondkirch | 200/61.2 |
| 3,283,092 | 11/1966 | Grostick | 200/61.2 |
| 3,468,457 | 9/1969 | Martin | 222/55 |
| 3,566,060 | 2/1971 | Phillips et al. | 200/83 |
| 3,623,366 | 11/1971 | Rowell | 73/301 |
| 4,296,287 | 10/1981 | Boulanger | 200/83.5 X |

*Primary Examiner*—Daniel M. Yasich
*Attorney, Agent, or Firm*—Mann, McWilliams, Zummer & Sweeney

[57] ABSTRACT

A bin level sensor that includes a diaphragm operated switch arrangement for sensing the level of material in bins, and containers, comprising a housing of disc-like configuration that is recessed on one side of same to define a diaphragm chamber over which a flexible diaphragm is secured that has a diaphragm plate applied to the inside surfacing of same and centered thereon which seats against and is centered with respect to a thrust shaft shiftably mounted in the housing; the thrust shaft includes one end against which the diaphragm plate acts and an opposite end against which is applied a swing arm that is adjustably spring biased against the indicated opposite end of the shaft and is operably associated with an off-on operating switch. The sensing device is mounted on the wall of a bin or container to expose the device diaphragm to the bulk material contained therein. When the device is oriented to sense the level of the bulk material involved, on the bulk material top level rising above the lower portion of the diaphragm, the diaphragm is indented inwardly of the diaphragm chamber to position the diaphragm plate of the unit involved so that is acts as a force multiplying lever in shifting the device shaft to effect level stabilization, which positioning is reversed when the bulk material level drops to the extent that the built in biasing action that acts on the device shaft restores the diaphragm plate flush against the diaphragm.

8 Claims, 6 Drawing Figures

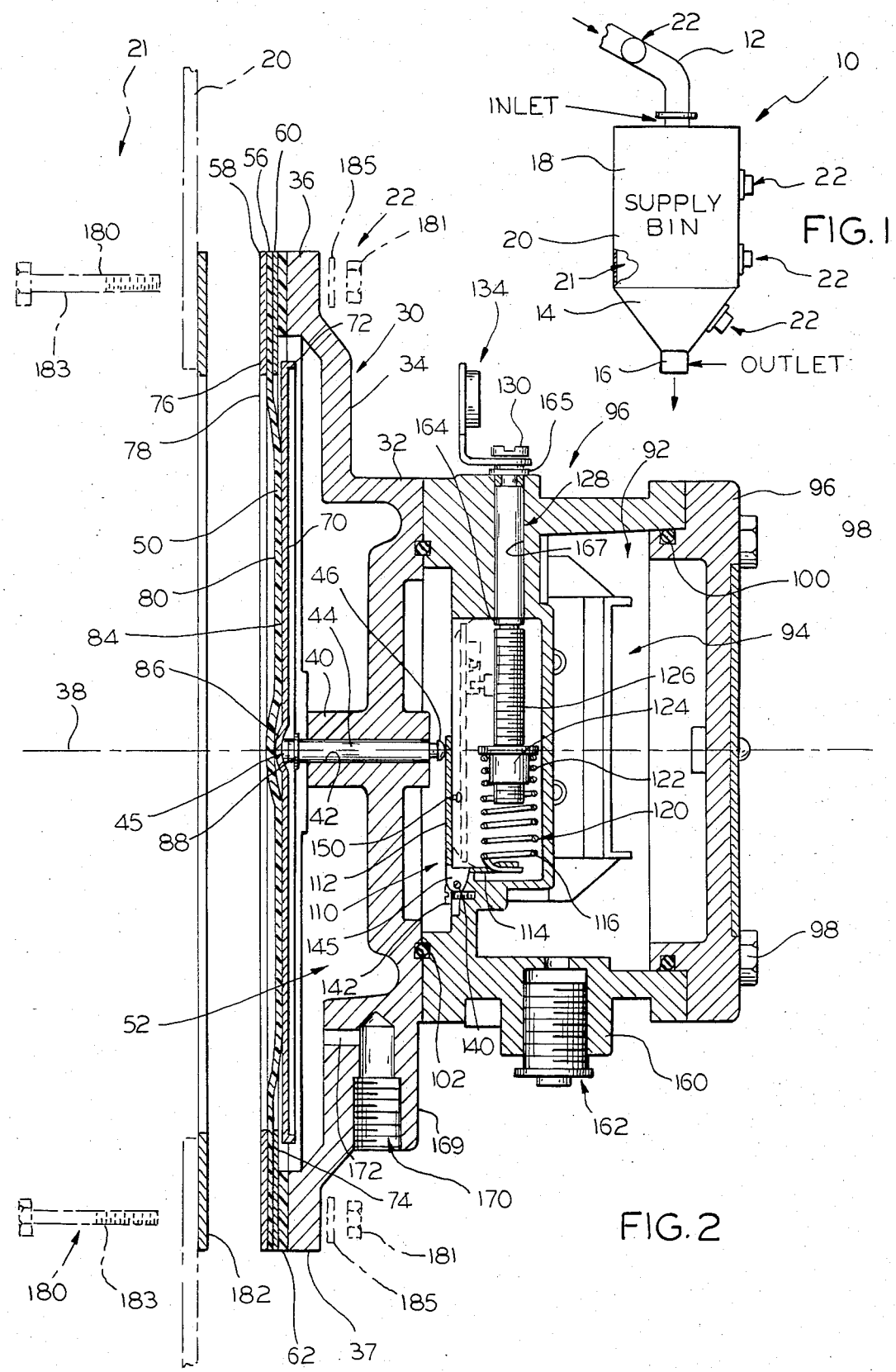

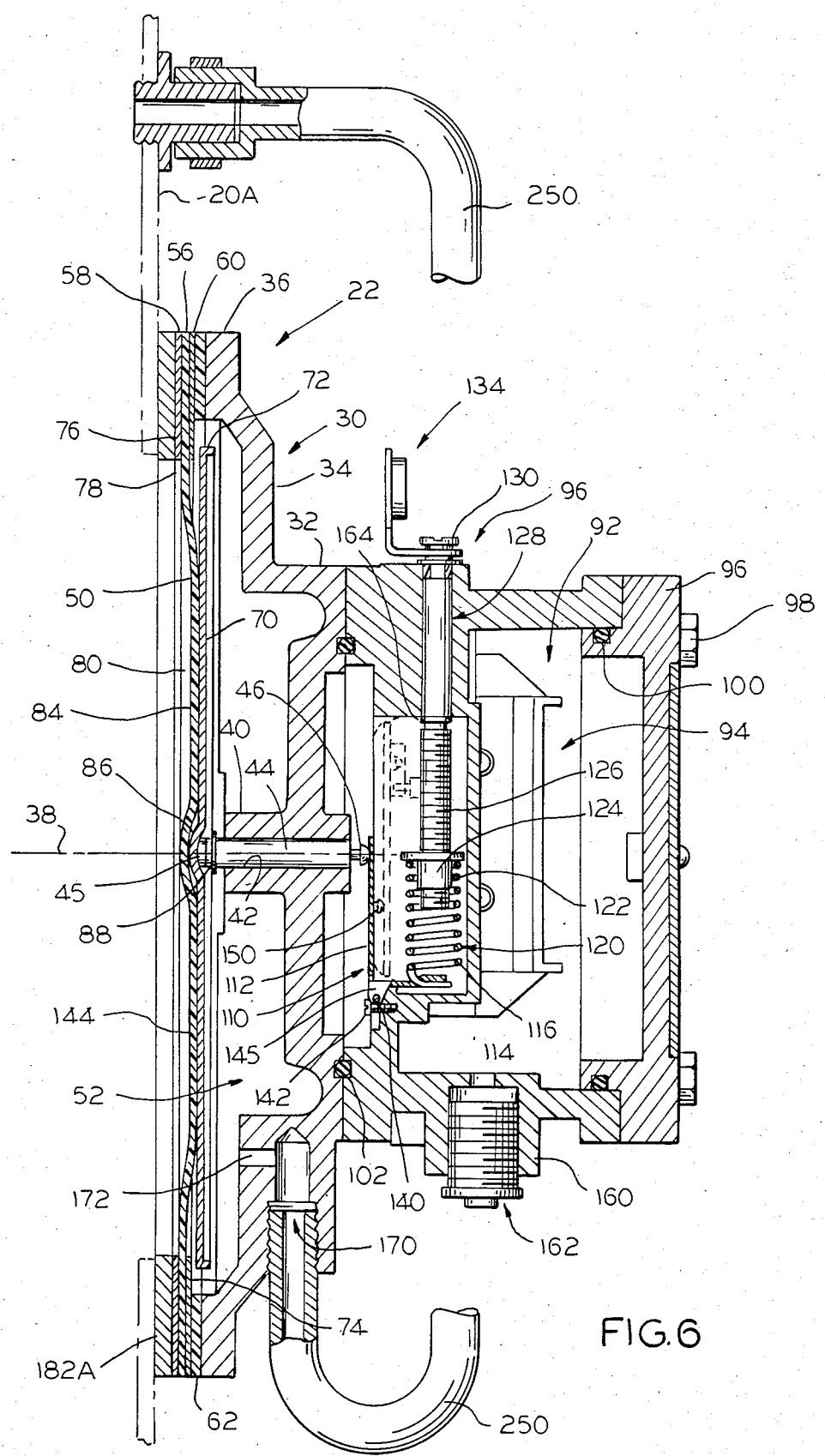

DIAPHRAGM OPERATED SWITCH TYPE BIN LEVEL SENSOR

This invention relates to what are commonly known as bin level sensors or indicators, and more particularly, to a bin level sensor of the diaphragm actuated switch type that is adapted for application to a wide variety of bins and other bulk material containers (including liquid containers) for sensing the level of the bulk material contained therein, controlling the elevation or top level of such bulk material in the bin or other container, and the like.

Bin level sensors are perhaps best known in the art as particulate material level controllers, as they basically are arranged to sense the top level of particulate material in a bin or the like, and provide off-on switch control operating switch that is in the electrical control circuit of the suitable bin feed mechanism that supplies the particulate material to the bin. Typically, a bin level sensor device is mounted on the side wall of a bin or the like and comprises a deflecting diaphragm that is exposed to the static pressure of the particulate material in the bin or the like when the bin is filled to the extent that the top level of the particulate material contained in the bin has risen to the level of the device diaphragm. When the particulate material of the bin is above the level of the lower margin of the indicator diaphragm, the static pressure of the particulate material acting sideways of the body of particulate material (in the bin) deflects the diaphragm laterally of same (and usually outwardly of the bin) to actuate a mechanism within the sensor that opens the indicated device operating switch to shut off the bin feed device and hold such operating switch in that position to leave the particulate material in the bin at such indicated level until further particulate material discharge is made from the bin. As the particulate material involved is discharged from the bin, its top level drops until the indicated particulate material no longer deflects the diaphragm to the extent needed to hold the bin level sensor the diaphragm to the extent needed to hold the bin level sensor operating switch open, whereupon the indicated operating switch is shifted to its closed position, by a biasing action or the like built into the device, for actuation of the bin feeder and further supply the particulate material to the bin up to the level that will cause the bin level sensor diaphragm to again open the indicated operating switch.

A principal object of the present invention is to provide a bin level sensor in which the diaphragm, in being deflected by the bin particulate material as the latter builds up in the bin, acts through a lever that provides a force multiplication action effecting shifting of the sensor operating shaft, for moving the sensor operating switch to closed position, whereby the said force multiplication action permits reduced static pressure operation of the switch, and assurance is provided that this type of device will effectively operate in sensing and controlling the bin level of light weight particulate materials such as sugar, sawdust, puffed wheat, and the like.

Another principal object of the invention is to provide an operating switch activating bin level sensor of the diaphragm type that can be applied to either planar or rounded walls of a bin, that can be readily applied not only to bins, but also conduits, chutes, and conveyor housings, and that can be employed singly or in pairs to achieve bin level control.

Another principal object of the invention is to provide a bin level sensor that is arranged for alternate use with pressurized container systems, such as those normally involving liquid within a storage container, with the bin level sensor being arranged for pressurization of the back side of the level indicator diaphragm to the same pressure as that of the storage container for balancing the static pressures acting on both sides of the diaphragm so that the indicator control switch is actuated only when the level of the material within the container is such that such material itself has static pressure actuation against the exposed diaphragm of the device.

Other objects of the invention are to provide a bin level sensor that is operable as a particulate material level sensor or a liquid level sensor, and in any position 360 degrees about the central axis of the device diaphragm, and whether the device is disposed vertically, horizontally, or otherwise positioned for static pressure application to the device diaphragm.

Still other objects of the invention are to provide a bin level sensor of few and simple parts, that is readily applied to bins or other containers or the like for use as particulate material or liquid level sensors, that provides for adjustment of the set point of the sensor for changing of level control provided by the device, that is particularly effective with light weight materials, and that is long lived in operation.

In accordance with the invention, the level sensor device is provided that comprises a housing of disc-like configuration that is recessed on one side of same to define a diaphragm chamber. The housing member also defines a central cross wall structure formed to define a passage thereacross that is located in alignment with the central cross axis of the device on which the indicated diaphragm chamber is centered. The housing member shiftably mounts a shaft in the indicated housing passage in close fitting relation thereto that has oppositely disposed ends, one of which is disposed in the diaphragm chamber and the other of which projects to the other side of the housing for application against a spring biased operating arm that in turn is to actuate a conventional microswitch suitably mounted and housed within the level sensor, with a suitable arrangement being provided to adjust the biasing action of the switch arm for adjusting the set point of the device switch. The sensor device further includes a flexible diaphragm mounted across the housing diaphragm chamber and having a perimeter that is fixed in sealed relation to the housing, and which is fixed in sealed relation to the housing by inside and outside diaphragm annular rings being clamped against the housing.

On the inside of the diaphragm, the device includes a diaphragm plate that is interposed between the diaphragm and the operating shaft of the device, at said one end of same, and in centered relation to the device diaphragm. The diaphragm plate is adhered to the diaphragm in the area of the diaphragm that is seated against the device operating shaft, with the diaphragm plate having a rim portion that is proportioned to be seated against the inside diaphragm mounting ring, when the diaphragm is in its unbiased relation with respect to the housing, and is free of contact with the bulk material contained within the bin or other container.

The sensor device of the present invention is applied to, for instance, the side wall of a bin or other bulk material container by cutting a hole therein proportioned to expose the major portion of the device diaphragm to the bulk material to be contained within the container, with the bin or other container being formed with suitable apertures about the thus formed diaphragm opening and the gasket and appropriate clamping bolts or nuts applied thereto, to fix the indicator to the bin or other container side wall. The indicator of the invention is arranged so that the back side of the diaphragm can be pressurized, where the container involved is to be under pressure, so as to be able to balance the pressure equally on both sides of the diaphragm.

Assuming that the sensor is applied to a bin for particulate material in the manner indicated, on application of particulate material to the bin so that its upper level builds up to the level of the bottom edging of the diaphragm, when the particulate material level is such that the static force generated thereby deflects the sensor diaphragm inwardly sufficiently to overcome the sensor indicator biasing action acting on sensor indicator operating shaft in the opposite direction, the sensor operating shaft operates to open the operating switch that is part of the sensor indicator (and which may be in the electrical circuiting of the mechanism which feeds the particulate material to the bin, and thus, when such switch is once closed, build up of the particulate material within the bin continues until such operating switch is opened). When discharge of the particulate material from the bin has reached the point where the upper level of the particulate material drops below the sensor diaphragm, the spring biasing action that is built into the sensor returns the sensor operating switch to its "on" or closed position for resupply of the particulate material to the bin.

Where the sensor is applied to liquid containers, the operation is in a similar manner, except this is one of the conditions of application where the back side of the diaphragm is pressurized to balance the pressure equally on both sides of the diaphragm for effective operation of the sensor operating switch only when the static pressure of the liquid within the container acts against the sensor diaphragm to effect the operating shaft movement that has been indicated.

Other objects, uses, and advantages will be obvious or become apparent from a consideration of the following detailed description and the application drawings in which like reference numerals indicate like parts throughout the several views.

In the drawings:

FIG. 1 is a diagrammatic illustration of a conventional supply bin arrangement showing various positions at which the level sensor of the present invention may be applied thereto in accordance with the present invention;

FIG. 2 is a diagrammatic transverse cross-sectional view through one embodiment of the invention, taken substantially along line 2—2 of FIG. 3, with the unit disposed in upright operating position wherein the sensor diaphragm is essentially vertically disposed, and is applied against a vertical wall of the bin or other container to which it may be applied, with the bin vertical wall being indicated in dashed lines, and the unit shown somewhat displaced from the bin vertical wall;

Figure 3:
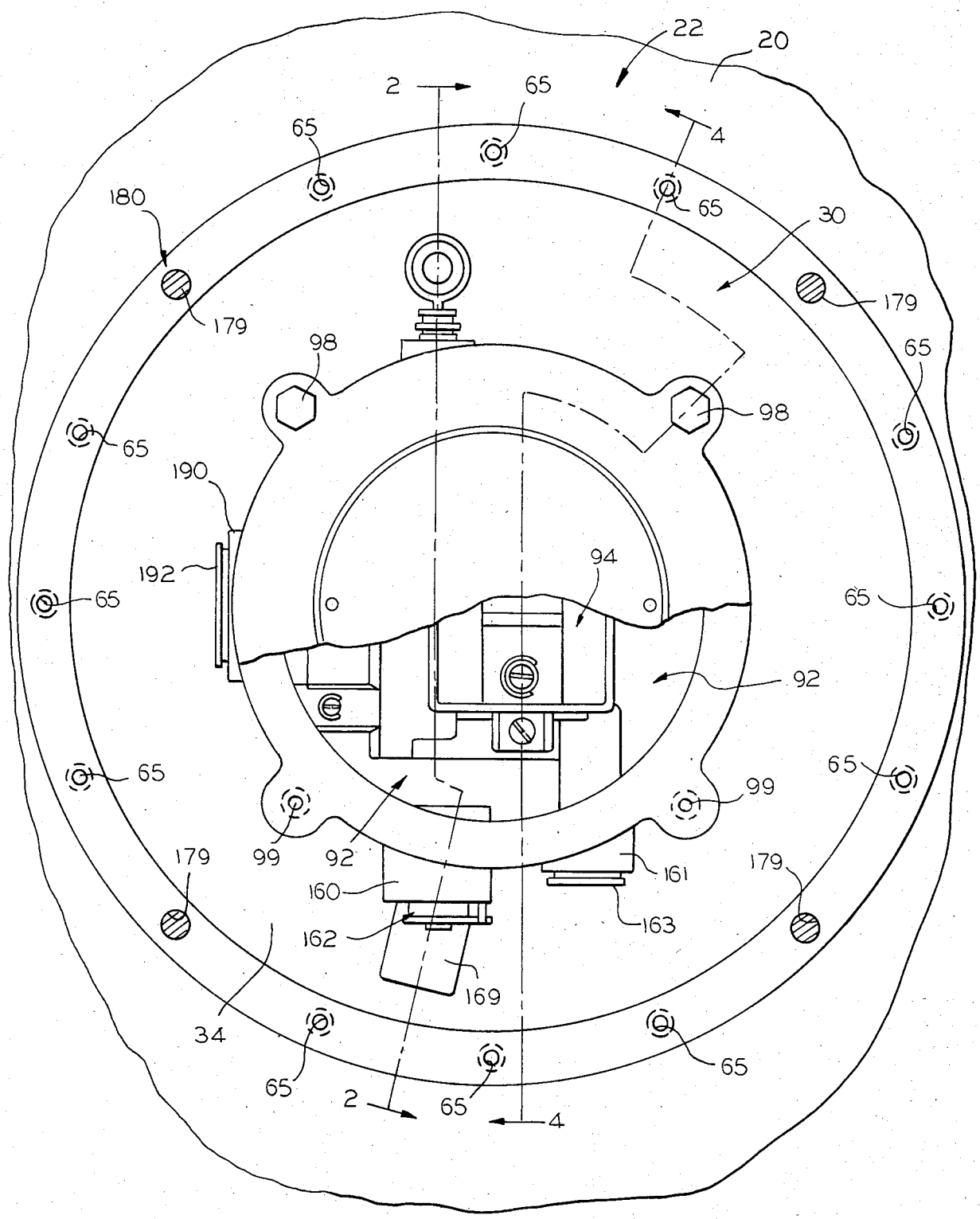
FIG. 3 is a rear elevational view of the sensor, with parts broken away, and taken as viewed from the right hand side of FIG. 2.
Figure 5:
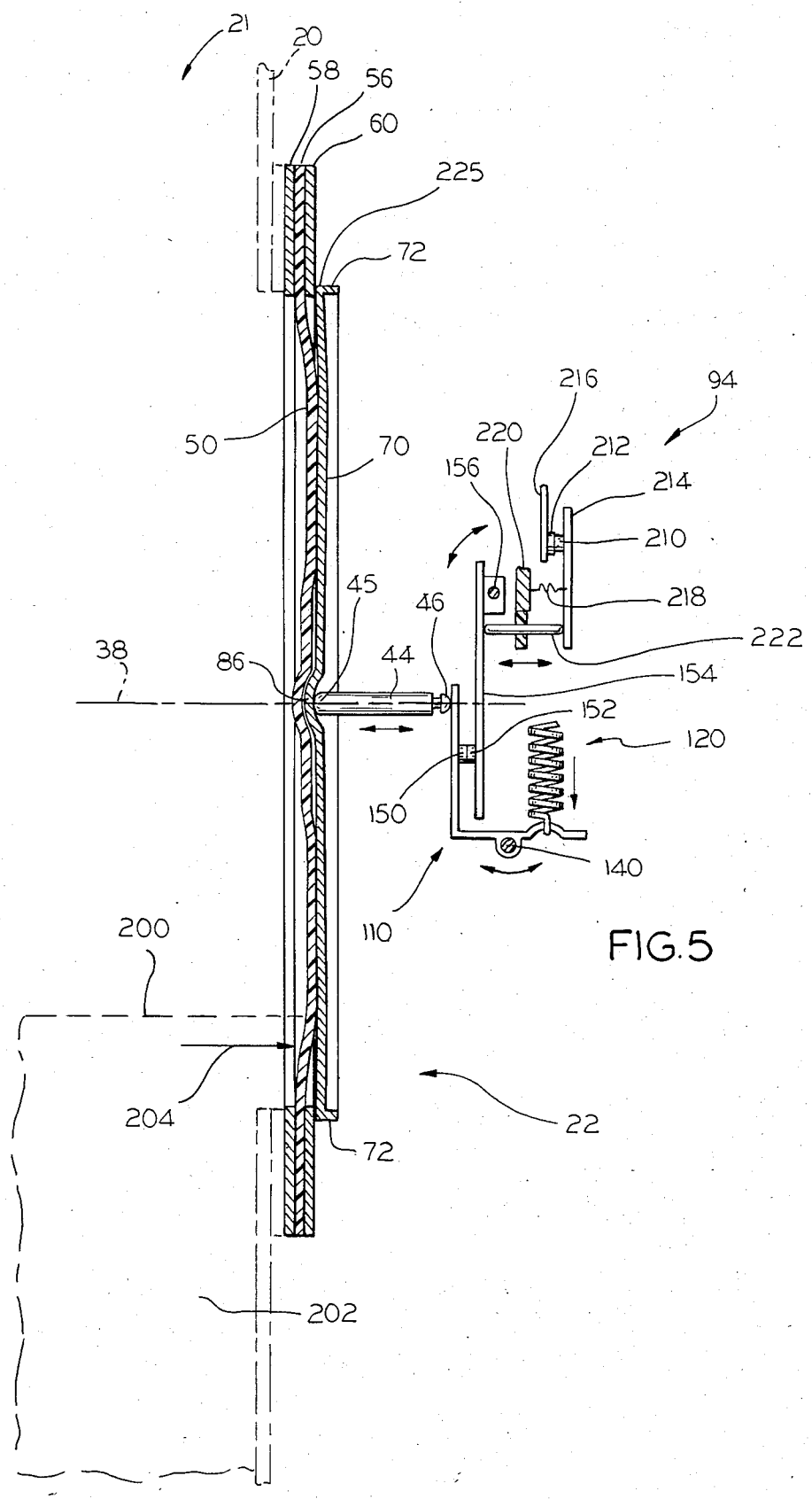

FIG. 5 is a view similar to that of FIG. 3, but illustrating diagrammatically the manner of operation of the sensor whereby the static force of the material contained within the bin acts on the sensor diaphragm and is translated through the device to actuate the operating switch that forms a part of the sensor; and FIG. 6 is similar to FIG. 2, but shows the sensor applied to a pressurized container containing a liquid, the top level of which is controlled pursuant to the invention, indicating also the manner in which the pressure of the bulk material container may be communicated to the back side of the sensor diaphragm.

However, it should be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

In the diagrammatic showing of FIG. 1, a supply bin 10 that is to receive and discharge particulate material, such as sawdust, puffed rice, pellets or globules of plastic material of substantially the same size, or the like is illustrated comprising an incoming conduit 12 suitably connected to the top of the bin 10 to form the bin inlet, and a lower bin funneling portion 14, terminating in a sleeve portion 16 that forms the outlet of the bin. The bin itself may be of quadrilateral or curvilinear transverse cross-sectional configuration that defines body portion 18 that is formed by the circumambient side wall 20 that conventionally is formed from sheet metal or the like arranged to define the bin chamber 21 that is closed about the bin inlet and is suitably connected to the bin funneling portion 14 for funneling the particulate material to be discharged from the bin through its outlet sleeve 16, which may be connected to a suitable discharge controller or may be disposed over a suitable horizontal conveyor for conveying the particulate material involved to a point of use, packaging, or perhaps point of treatment.

The reference numerals 22 of FIG. 1 each indicate a level sensor arranged in accordance with the present invention, and the possible operable locations of same on or adjacent the bin 10.

As has been discussed, the level sensor 22 of the present invention may also be applied to the side wall or the like of liquid containers for sensing and controlling the level of liquid contained therein (see FIG. 6).

Figure 4:
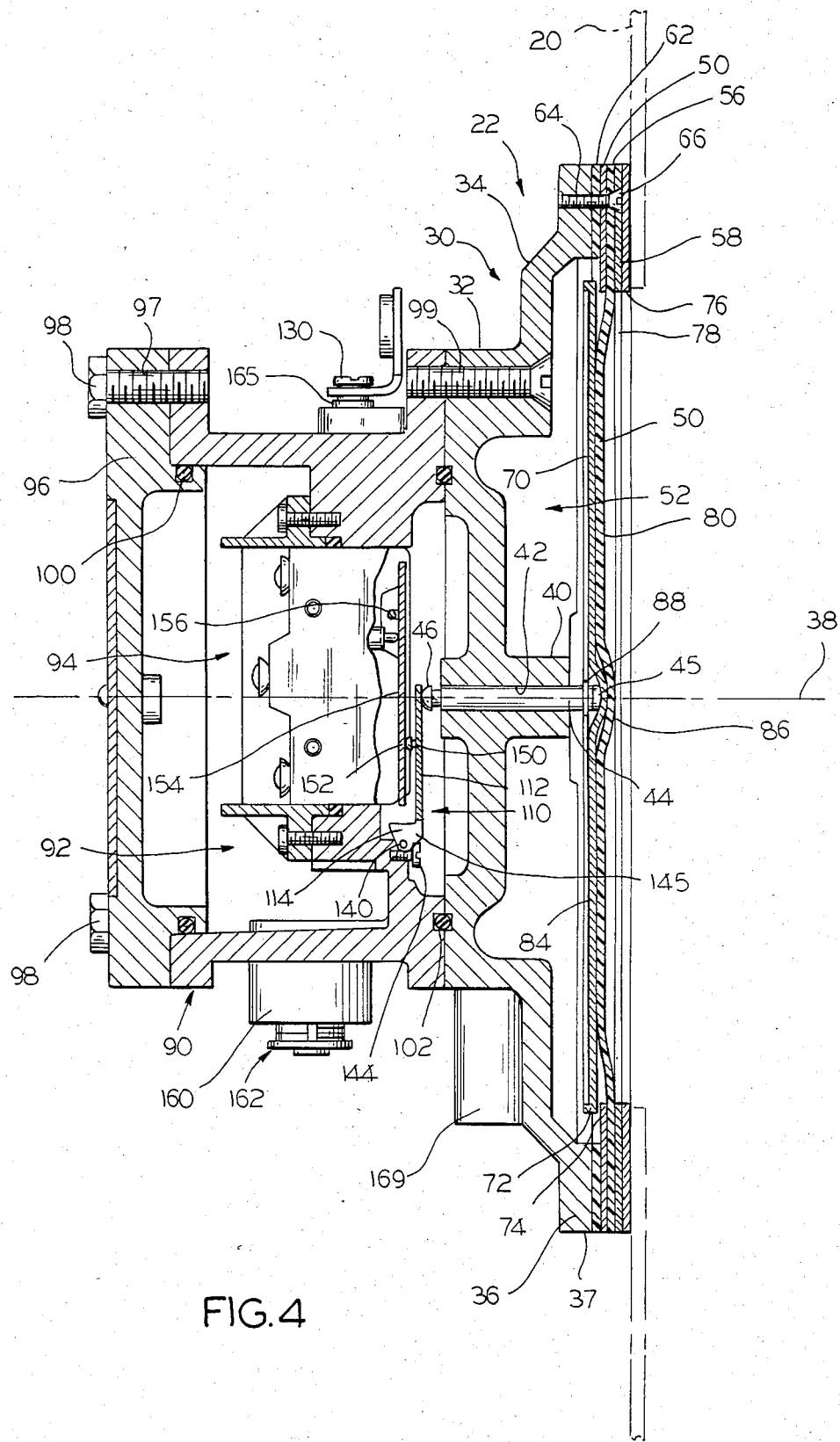
FIG. 4 is a vertical cross-sectional view through the sensor as taken along line 4—4 of FIG. 3.

FIGS. 2–4 illustrate diagrammatically the general arrangement of the sensor 22, with the sensor 22 of these figures being shown as applied to a vertically disposed, planar wall 20 of a bin 10 that is to contain dry particulate material.

The sensor 22 generally comprises a housing 30 of disc-like configuration defining a central wall 32 that is integral with an outwardly flared flanging 34 having a rounded annular clamping section 36 at its outer periphery 37. The indicated portions of the diaphragm housing 34 are of curvilinear configuration struck about the central axis 38 of the indicator 22, with the central wall portion 32 defining an inner stud portion 40 that is shaped to define cross passage 42 that is centered on the central axis 32 of the indicator 22.

Slidably mounted and in close fitting relation to the cross passage 42 is cross pin 44 having an outer convexly spherically contoured end 45 and an inner convexly spherically contoured end 46, with the shaft or pin 44 being proportioned and slidably mounted in the cross passage 42 for limited movement longitudinally of the cross passage 44.

The unit 22 as assembled includes suitable flexible diaphragm 50 that is applied to the clamping section 36 of housing 30, and to define with the housing 30 a diaphragm chamber 52 that is concentric about cross passage 42 and its pin 44.

The diaphragm 50 is connected in sealing relation to the housing 30 by having its perimeter 56 applied between front diaphragm ring 58 and back diaphragm ring 60 that in turn seats against a suitable annular diaphragm gasket 62 that is applied to the clamping portion 36 of housing 30. As indicated in FIGS. 3 and 4, the diaphragm rings 58 and 60, with the diaphragm perimeter 56 therebetween, and the diaphragm gasket 62 are suitably secured to the housing clamping portion 36 by applying suitable screws 64 (see FIG. 4) therethrough and in threaded relation to apertures 65 of the housing clamping portion 36 and with their heads 66 against the outer diaphragm ring 58.

Applied between the diaphragm 50 and the outer end 45 of shaft or pin 44 is diaphragm plate 70 that is round in configuration and slightly dished in transverse section; plate 70 has a perimeter or outer margin 72 that in diameter exceeds the internal diameter of the inner diaphragm ring 60, such that when the diaphragm plate 70 is urged to the left of FIG. 2 and to the right of FIG. 4, its periphery 72 is seated against the inner periphery 74 of the inner diaphragm ring 60.

The outer diaphragm ring 58 defines an inner marginal portion 76 that is open as at 78 to expose the diaphragm 50, namely its external or outwardly facing surfacing 80, to the particulate material of bin 10 when the device 10 is mounted in its operating position, as will be described hereinafter. The inwardly facing diaphragm surfacing 81 faces housing 30.

The diaphragm plate 70 central portion 84 is generally planar in configuration, with the diaphragm plate 70 being formed with spherically contoured seat 86 that complements the general shaping of the operating shaft or pin end 45. A suitable snap type retaining ring 88 received in a correspondingly located groove in the shaft or pin 44 limits the amount of movement of the shaft or pin 44 to the right of FIG. 2 and to the left of FIG. 4.

Suitably mounted on the diaphragm chamber housing 30 is a conventional switch housing 90 defining a switch chamber 92 in which is mounted a conventional microswitch 94. Housing 90 is suitably closed by appropriate back plate 96. Suitable bolts 98 having elongate stems 97 (see FIG. 4) affix the back plate 96 to one side of housing 90; housing 30 is fixed to the other side of housing 90 by suitable screws 99 that are axially, respectively, aligned with bolts 98 (compare FIGS. 3 and 4). Back plate 96 is equipped with a suitable sealing O ring 100, and a second suitable sealing O ring 102 is suitably applied between the housings 90 and 30, as indicated in FIGS. 2 and 4, about the diaphragm housing central portion 32.

The housing 90 is equipped with a conventional switch arm actuator device 110 having an elongate arm 112 that is engaged by the inner end 46 of cross shaft 44, and a relatively short arm 114 that is operably connected to one end 116 of tension spring 120 (see FIG. 2) that comprises the range spring of the device 22, and has its other end 122 suitably anchored to nut 124 that is suitably threaded on threaded stem 126 of adjustment screw 128 that is suitably journaled in housing 90 and has its slotted operating end 130 exposed for changing the tension of the range spring 120 when adjusting the set point of actuator device, and thus of sensor 22. The exposed end 130 of adjustment screw 128 in the embodiment illustrated may be suitably covered by a suitable plastic cap 134 that is swung down and over the head 130 when the range spring has been adjusted to provide the desired tension to bias shaft 44 outwardly or to the left of FIG. 2, as desired for a particular setting of the device 22.

The swing arm device 110 includes suitable pin 140 anchored in place by a pair of set screws 144 applied against same, with the pin 140 passing through a pair of flanges 145 that are integral with the swing arm 110 (see FIGS. 2 and 4), whereby the swing arm 110 is pivotally mounted with respect to switch housing 90.

The elongate arm 112 of the swing arm device 110 is formed with a suitable head 150 that is to engage the corresponding head 152 of the microswitch device swing arm 154 that is pivoted about axis 156 in a conventional manner for moving the conventional switch 94 between off and on operating positions, as will be apparent the those skilled in the art.

The housing 90 is also preferably formed to define a threaded stud portion 160 that threadably receives a conventional drain assembly 162 pursuant to Underwriters Laboratory requirements with regard to such devices as herein disclosed, and the adjustment screw shaft 128 is suitably cross grooved to mount retaining rings 164 and 165 that preclude movement of the screw 128 longitudinally thereof and the bore 167 of housing 90 in which screw 128 is in effect journaled. Housing 90 that is illustrated includes an optional tubular stud portion 161 that is sealed closed by suitable plug 163 in the illustrated embodiment.

In accordance with the invention, the diaphragm chamber housing 34 is formed with a stud portion 169 having a threaded port 170 leading to passage 172 that communicates with diaphragm chamber 52 for pressurizing the diaphragm chamber 52 when the sensor 22 is to be used in connection with pressurized systems, as will be disclosed hereinafter. Normally the chamber 52 is vented to atmosphere when used in connection with a bin that is to receive particulate type bulk material.

The sensor 22 assembled as indicated in FIGS. 2, 3 and 4 is employed in connection with a bin, such as that indicated at 10 in FIG. 1, by selecting a location on the bin where the flow of the particulate material to be applied to the bin is desired, avoiding areas of the bin that are characterized by excess heat and/or vibration. A hole is cut in the bin wall that is comparable in size to the internal diameter of the outer diaphragm ring 58, and holes are formed in the bin wall 20 congruent in location to the four bolt holes 179 of the clamping portion 36 of housing 30 to which the screws indicated at 180 in FIG. 3 are applied (the screws 180 being shown in dashed lines in FIG. 2, and transverse section in the showing of FIG. 3). Suitable annular gasket 182, formed from a suitable rubber or rubber-like material, such as neoprene, having similar holes formed therein, that are congruent to the holes 179 for the bolts 180, is applied flat against the exterior of the bin side wall 20, in the manner suggested in FIG. 2, after which the bolt receiving holes 179 of the housing 30 are aligned with the bolt receiving holes of gasket 182 and bin wall 20, and the bolts 180 applied thereto, with the ends of the bolts disposed on the inside of bin wall 20, and their securing nuts 181 received over the bolt stems 183 that extend exteriorily of the housing clamping portion 36, and with locking rings 185 interposed therebetween.

Where the side wall 20 of the bin or other bulk material container is of rounded configuration rather than planar, the gasket 182 should be sufficiently thick to accommodate the application of the housing 30 and its diaphragm construction to the curvilinear wall 20 in fully sealed relation 360 degrees thereabout.

The switch housing 90 is suitably formed to define conduit receiving hub 190 (see FIG. 3) equipped with a suitable plastic plug 192 through which lead wires may be applied into the switch chamber 92 for appropriate connection to the switch 94 that includes the usual terminals for connecting same in the electrical circuit of a suitable particulate material feeding mechanism that supplies the particulate material to the bin 10 when the feeding device is electrically actuated through indicator 22, as will now be described.

Referring now to diagrammatic FIG. 5, the principal parts of the sensor 22 that the particulate material of the bin actuate when the top level 200 of the body 202 of particulate material within the bin 10 reaches the elevation within the bin where the level 200 is above the lower margin of the diaphragm 50 of the indicator 22. In this connection, for purposes of illustration it is assumed that the mechanism for supplying the particulate material to bin 10 is electrically operated to feed the particulate material to the upper conduit 12 from which it falls into the bin to form the body of particulate material 202. Assuming that the outlet of the bin includes the usual mechanism (not shown) for controlling outflow of the particulate material from the bin, and such mechanism has been operated to shut off the discharge of the particulate material from the bin 10 or significantly slow it down so that the supply of particulate material to the bin is greater than the discharge of same therefrom, under such conditions the top level of the particulate material body 202 will rise relative to the bin chamber 21, when the particulate material is being supplied to bin 10.

In accordance with the present invention, when the top level 200 of the particulate material body 202 rises sufficiently above the lower marginal portion of the sensor 22, and in particular the lower portion of the diaphragm 50 of the sensor 22, the vector arrow 204 representing the sidewise directed static pressure of the particulate material acting sidewise of the bin 10, acts against the diaphragm 50, tending to deflect same to the right of FIG. 5. The range spring 120, in setting up the sensor 22 for operation, has been set to apply a predetermined bias through swing arm device 110 to shaft or pin 44 to in effect hold the diaphragm rim 72 seated against the inner or back diaphragm ring 60, 360 degrees thereabout.

As to the microswitch 94 or its equivalent, its two contacts, diagrammatically illustrated as contacts 210 and 212 suitably affixed to electrically conductive arms 214 and 216, respectively, are held together in any suitable manner, as by employing the diagrammatically illustrated tension spring 218 applied between the switch arm 214 and the switch housing wall 220. This also applies a bias to the switch swing arm 154 through the plunger 222 it operates that swings the switch arm 154 about pivot pin 156 so that the switch arm head 152 maintains contact with the head 150 of swing arm 110.

The range spring 120 is adjusted by turning the adjustment screw 130, to adjust the spring bias applied to shaft or pin 44 the approximate amount that will equal the particulate material generated sideways acting static force, represented by vector 204 of FIG. 5, at the level 200 within the bin chamber 21 that is desired for shut off of the particulate material feed to the bin. When the top level 200 of the particulate material body 202 reaches the indicated level, the static force of the body 20 acting against the diaphragm 50 will be sufficient to just oppose the spring bias applied to the shaft 44, with a further elevation of the level 200 deflecting the diaphragm 50 to the right of FIG. 5 along the lower margin of same, and with the diaphragm plate 70 then fulcruming as at 225 with respect to the back diaphragm ring it is seated against, in the manner of a second class lever, to then thrust the pin or shaft 44 to the right of FIG. 5, and correspondingly pivoting swing arm device 110 clockwise about its pivotal mounting 140 to effect through the head 150 a pivotal movement of the switch swing arm 154 counterclockwise of the pivotal mounting 156 to effect opening of the switch contacts 210 and 212, against the bias of the diagrammatically illustrated tension spring 218.

This action interrupts the electrical circuit through which the electrically operated feeder (or the like) supplying the bin 10 operates, to then shut off the particulate material flow to the bin 10. The top level 200 of the particulate material body 202 will then remain stationary if no particulate material is removed from the bin, and on removal of the particulate material from the bin the top level 200 will move downwardly of the bin and gradually below the location of the sensor 22, by which time the biasing action applied by the spring device 120 has overcome the sidewise particulate material static force represented by vector 204 to return the shaft 44 to the left of FIG. 5 such that the diaphragm plate 70 is seated against the rear gasket ring 360 degrees there about, and the microswitch parts in following the resulting movement, effect the closure of the contacts 210 and 212 for resupply of the particulate material to the bin 10.

In this connection, the illustration of the sensor switch 94, as it has been shown in FIG. 5, is intended to be only diagrammatic in nature, the principal function of FIG. 5 being to indicate the second class lever action of the diaphragm plate 70 when the particulate material level actuates sensor 22 to cut off particulate material supply to bin 10.

In FIG. 6, the sensor 22 is illustrated applied to a pressurized container or tank 20A of rounded configuration, it being applied thereto in the same manner as described in connection with the showing of FIGS. 2–4, except that the gasket 182A is substantially thicker so that the indicator may be pressed into full sealing relation with the container side wall 360 degrees thereabout. FIG. 6 also illustrates diagrammatically the conduit 250 that is applied between the socket 170 of the housing 130 and the tank above the bulk material contained therein (usually liquid) to communicate the pressure of the tank 20A to the diaphragm chamber 52, and thus against the back side of the diaphragm.

As is known in the art, microswitches are inherently snap switches, and such switches have a set point or actuation point that is determined by the setting of the range spring 120 using adjustment screw 130, in this case to effect actuation of the microswitch through operation of the indicator when the bulk material level is at or near the desired upper level within the container. This also means that the switching arrangement of the sensor 22 will also have what is known in the art as a "dead band", which is the pressure that must be removed before the switching involved resets for another cycle of supply of particulate material or the like to the bin, after the set point has been reached and the switch actuated in the manner hereinbefore described.

While it is preferred that the sensor 22 be applied to the bin or bulk material container so that the drain assembly 162 is downwardly directed, the sensor 22 in practice is operable insofar as the switching arrangement involved therein, in any position 360 degrees thereabout, with regard to the bin side wall aperture to which it is to be applied. Further, the sensor 22 can be mounted on a horizontal surface above which the bulk material rides, to sense the weight of same, and, of course, as indicated in FIG. 1, the sensor could be applied to any one of the positions shown in FIG. 1.

The sensor 22 can be employed to sense and control bulk material level by employing a single sensor 22, or by employing a pair of such units, such as the two sensors 22 shown affixed to the bin side wall 20 in FIG. 1. For arrangements of this type, the wiring of the switches 94 involved is made such that the level of the material (for instance, the level of the particulate material within bin 10) within the bin would range between the upper and lower units of side wall 20, with the material level, when it has dropped to the level of the lower indicator, effecting actuation of the bin supply mechanism for supplying material to the bin or other bulk material container, and when the material level reaches the upper indicator, the wiring arrangement is similar to that diagrammatically illustrated in FIG. 5 for shut off of the mechanism for supplying particulate material to bin 10 for setting the uppermost level of the particulate material within the bin 10. The wiring connections to conventional switches 94 may be in accordance with the designer's needs.

It is preferred that the sensor 22 be made explosion-proof and weatherproofed in accordance with Underwriters Laboratories requirements in this regard, whereby the housing of the sensor is made such as to withstand explosions within same, and insure that any gas escaping as a result of such explosions are cooled off before they reach the ambient air so that they will not ignite. The housing arrangement of the sensor 22 as illustrated in FIGS. 2-4 is arranged in accordance with Underwriters specifications to provide a four to one safety factor to contain explosions within same.

Microswitches 94 of the type illustrated are offered by Micro Switch Division of Honeywell, Freeport, Ill., but the same basic structure is offered by a number of other firms as "off the shelf" items.

While the diaphragm of the sensor 22 may be formed from any suitable elastometric material, in a successful embodiment of the invention the diaphragm is a composite structure comprising a nylon fabric core to each side of which is molded neoprene sheeting, for long wear and corrosion resistance.

In the illustrated embodiment the sensor 22 exposes the diaphragm at a six inch diameter aperture, which is the internal diameter of the respective diaphragm rings. The opening made in the bin side wall or the like to which the indicator 22 is applied should be of comparable dimension.

As has been indicated, the sensor 22 has a general arrangement (see FIG. 5) in which the static side force exerted by the bulk material against the bin or tank side wall, on reaching the set point of the indicator, biases the diaphragm to shift the diaphragm plate in second class lever fashion whereby a force multiplication action occurs thereby multiplying the force applied by the diaphragm plate to pin 44; leverage on the order of two to one is involved, which makes the sensor 22 of the present invention particularly sensitive to operational functioning when the device is employed in connection with controlling the top level of light weight particulate materials, such as sawdust, puffed wheat or the like.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A bin level sensor device, said device comprising:
    a housing member that is recessed on one side of same to define a diaphragm chamber, having a central cross wall structure defining a passage thereacross that is located in alignment with the center of said diaphragm chamber and defines the central axis of said device,
    a shaft shiftably mounted in said passage in close fitting relation thereto and having its opposed ends projecting therefrom, with one of said shaft ends being disposed in said diaphragm chamber,
    a diaphragm mounted across said diaphragm chamber and having a perimeter that is fixed in sealed relation to said housing,
    a diaphragm plate interposed between said diaphragm and said one end of said shaft within said chamber in centered relation to said diaphragm, and said shaft and being disposed on one side of said diaphragm,
    said diaphragm plate being seated against said shaft one end,
    with the other side of said diaphragm being exposed about said axis a predetermined amount for actuation inwardly of said diaphragm chamber under pressure of particulate material of a bin,
    said device including means for fulcruming said diaphragm plate at a predetermined location of the housing member on the margin of same when said diaphragm is deflected against said diaphragm plate on the opposite side of said axis,
    and including off-on switch means mounted on the other side of said housing member actuated by said shaft adjacent the other end of said shaft and including means for adjustably spring biasing said shaft lengthwise of said axis in the direction of said diaphragm plate.
2. The bin level sensor device of claim 1 including:
    marginal inner and outer clamp plates between which said diaphragm perimeter is fixed to said housing.
3. The bin level sensor device of claim 2 wherein:
    said diaphragm plate fulcruming means comprises the inner clamp plate,
    said biasing action on said shaft seating said diaphragm plate against said inner ring in the neutral relation of said device.
4. The bin level sensor device of claim 2 wherein:
    said diaphragm and said diaphragm plate are round in marginal configuration, with said housing and said clamp plates being rounded in conformity to said diaphragm and said housing,
    said diaphragm plate being seated against its perimeter against said inner clamp plate by said biasing of said shaft for forming said fulcruming means, whereby when said device is disposed in sensing relation to a bin with said axis horizontally disposed and said diaphragm is open to the bin interior, particulate material of the bin reaching the level of said diaphragm effect said fulcruming of said diaphragm plate against the bias of said shaft independent of the position of said device rotationally of said axis.

5. The bin level sensor device of claim 4 including:
means for pressurizing said diaphragm chamber to a predetermined pressure.

6. A bin level sensor device, said device comprising:
a disc like housing member that is recessed on one side of same to define a diaphragm chamber having a central cross wall structure defining a passage thereacross that is located in alignment with the center of said diaphragm chamber, and defines the central axis of said device that extends crosswise of said housing,
a shaft shiftably mounted in said passage in close fitting relation thereto and having its opposed ends projecting therefrom, with one of said shaft ends being disposed in said diaphragm chamber,
a diaphragm mounted across said diaphragm chamber and having a perimeter that is fixed in sealed relation to said housing,
a diaphragm plate interposed between said diaphragm and said one end of said shaft within said chamber in centered relation to said diaphragm, and said shaft and being disposed on one side of said diaphragm,
said diaphragm plate being seated against said shaft one end,
with the other side of said diaphragm being exposed about said axis a predetermined amount for actuation inwardly of said diaphragm chamber under pressure of particulate material of a bin,
said device including means for fulcruming said diaphragm plate at a predetermined location of the housing member on the margin of same that is approximately one hundred eighty degrees from the portion of said diaphragm engaged by the particulate material,
and including off-on switch means mounted on the other side of said housing actuated by said shaft adjacent the other end of said shaft,
said switch means including means for adjustably spring biasing said shaft against said diaphragm plate, and means for providing off-on control of the particulate material supply to the bin.

7. The bin level sensor device set forth in claim 6 wherein:
said shaft one end is convexly spherically contoured, and said diaphragm plate being formed with a complementary contoured seat against which said shaft one end engages.

8. The bin level sensor set forth in claim 7 wherein:
said diaphragm is adhered to said diaphragm plate at said plate seat.

* * * * *